L. D. MILLS.
FILTER.
APPLICATION FILED JULY 14, 1920.
1,433,966.
Patented Oct. 31, 1922.
2 SHEETS—SHEET 2.
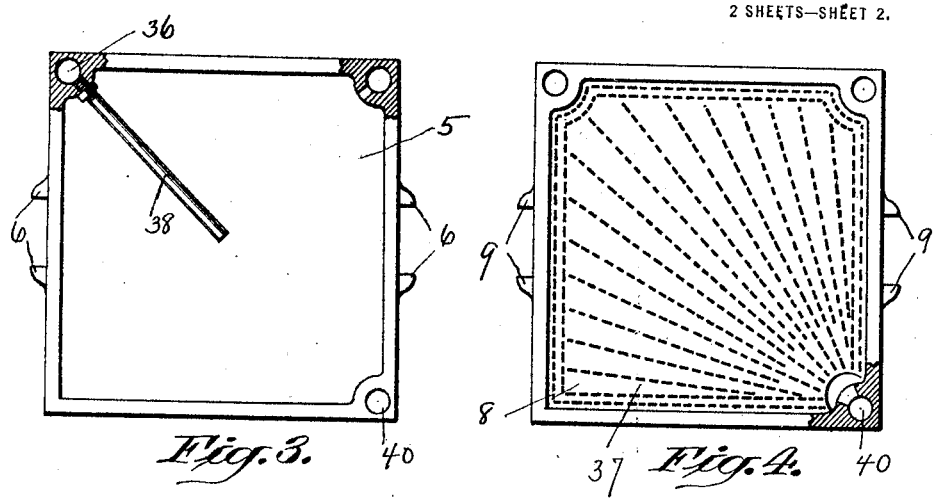
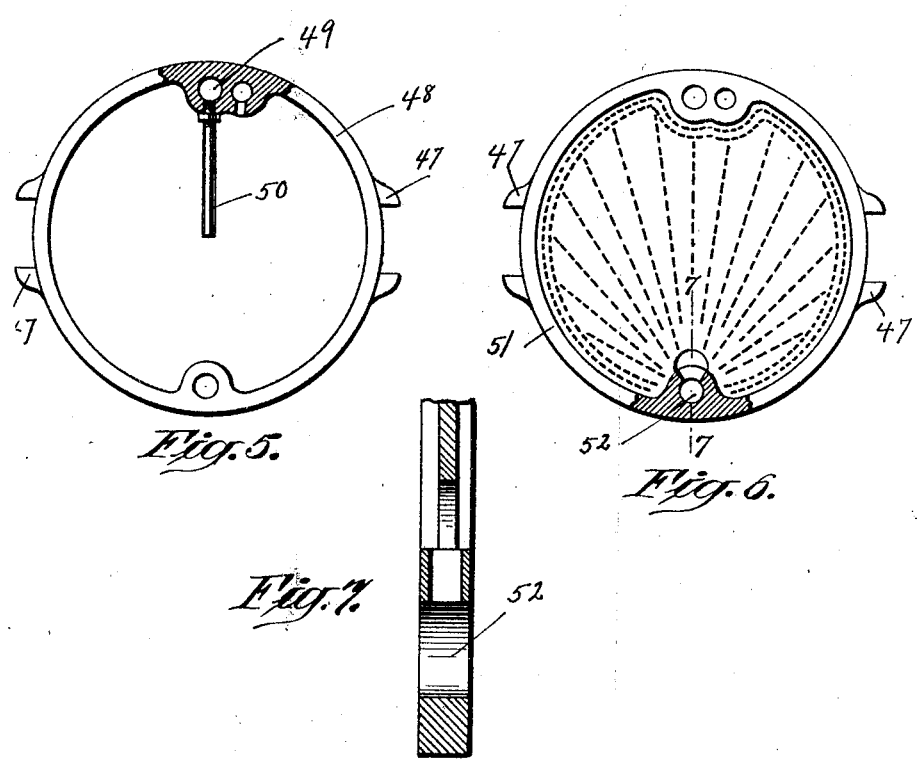
Inventor
Louis D. Mills
By his Attorney
Archibald Cox Patented Oct. 31, 1922.

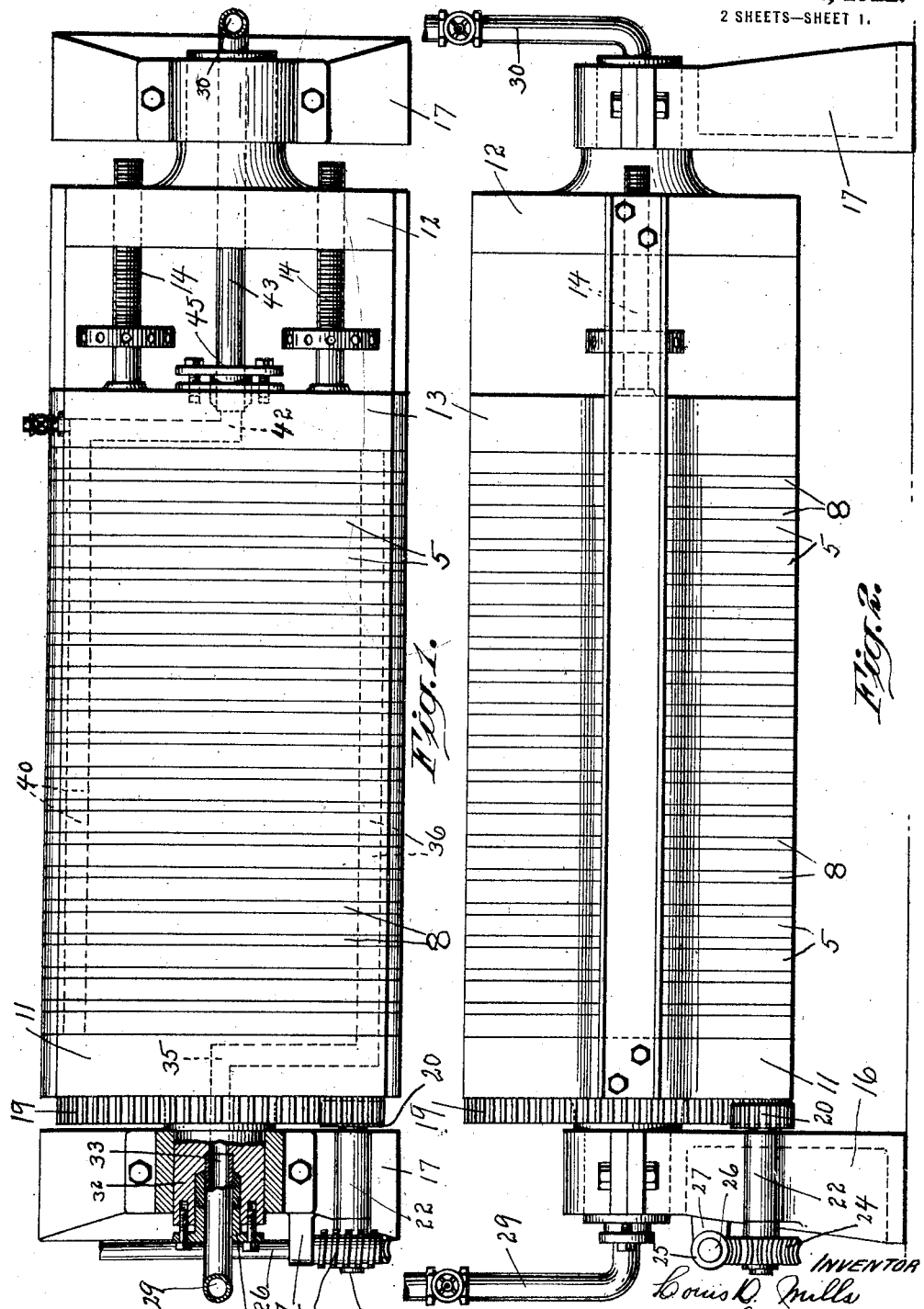

1,433,966

UNITED STATES PATENT OFFICE.

LOUIS D. MILLS, OF REDWOOD CITY, CALIFORNIA, ASSIGNOR TO THE MERRILL COMPANY, OF SAN FRANCISCO, CALIFORNIA, A CORPORATION OF CALIFORNIA.

FILTER.

Application filed July 14, 1920. Serial No. 396,057.

*To all whom it may concern:*

Be it known that I, LOUIS D. MILLS, a citizen of the United States, and a resident of Redwood City, in the county of San Mateo and State of California, have invented certain new and useful Improvements in Filters, of which the following is a specification.

The invention relates to filters, and more particularly to filter presses of the plate and frame type in which a solution carrying solids in suspension is conducted to a filtering medium upon which the solids are deposited and through which solutions are passed.

It is desirable in the operation of this type of filter to secure a uniform and homogeneous layer of the solids over the surface of the filtering medium in order that there may be a uniform and intimate contact between the solutions and the solids as the solutions pass through the solids on the filtering medium. With such filter presses as at present constructed, it is impossible to secure the deposition of a homogeneous layer of the solids uniformly over the surface of the filtering medium. In filter presses of the frame and plate type the various sizes of solids tend to segregate so that the contact between the solids and the solutions passing through them is not uniform. Many efforts have been heretofore made to secure a more homogeneous layer of the solids and a more uniform distribution of them over the filtering medium, but thus far with only partial success. Either the layer is not homogeneous, or it is not uniformly distributed, or it is neither homogeneous nor uniformly distributed. This undesirable condition has been caused by maintaining the filtering medium and the stream of solution carrying the solids in suspension in fixed relative positions so that the action of gravity tends to segregate the solid particles according to their weight. Efforts have been made to counteract this segregation by violently agitating the solution as it enters the containers and comes in contact with the filtering medium. These efforts have proven more or less unsuccessful with the result that at the present time, when the filtering medium is removed from the press, it is found that the particles of similar substances have segregated on the filtering medium according to their respective sizes. And in processes dependent upon a uniform and equal contact between solutions and solid particles deposited within such presses, this segregation has resulted in imperfect results.

The object of the present invention is to secure a more homogeneous and more even or uniform deposition or distribution of the solid particles over the surface of the filtering medium, in order that each unit volume of solutions subsequently passed through the filter shall come in contact with an equivalent unit area of solid matter, that is to say, there will be a uniform contact between the solutions and the solid particles for the purpose of accomplishing the desired reaction. With this object in view, the invention consists in continually changing the relation or relative positions between the filtering medium and the stream of solution carrying the solid particles in suspension. By continuously moving the surface of the filtering medium with relation to the flow of the stream of solution and in conjunction with the flow of solution, the force of gravity tends to uniformly distribute the solid particles over the filtering medium with the result that the coarser and finer particles are homogeneously mixed and deposited in a layer uniform in thickness. Therefore all solutions, whether carrying solid matter in suspension or not, that pass through the filtering medium, come into intimate and uniform contact with all the solid particles. This results in effecting a reduced consumption of the material used or required to form the layer of solid particles on the filtering medium, and in a more efficient performance of the chemical reaction desired.

The preferred form of the invention is illustrated in the accompanying drawings in which Figs. 1 and 2 are respectively a plan and a side elevation of a plate and frame filter press embodying the principles of the invention; Fig. 3 is a side elevation of a frame and Fig. 4 is a side elevation of a plate used in a rectangular filter, this being the preferred form of the invention; Fig. 5 is a side elevation of a frame and Fig. 6 is a side elevation of a plate used in a cylindrical filter; and Fig. 7 is a section taken on the line 7—7 of Fig. 6.

The filter of the invention may be used for causing an intimate contact between solutions passing through a filtering medium and solid particles deposited upon the surface of the filtering medium for whatever purpose it is desired to secure this intimate and uniform contact between solutions and solid particles. The solid particles may be introduced continuously with the stream of solution or the solid particles may be introduced with solution to form a deposit upon the surface of the filtering medium and then other solutions passed through them. Moreover, the filter is adapted for use where all or a portion of the solid particles are precipitated from the solutions.

For the purpose of illustrating the principles of the invention it is assumed that the filter illustrated in the drawings, and particularly described hereinafter, is employed for precipitating and recovering metals from cyanide solutions. In this method a stream of solution in which the metals have been dissolved carries the solid particles of precipitant in suspension. The solid particles of precipitant are deposited over the surface of the filtering medium. Then as the solution of the dissolved metals passes through the particles of precipitant the metals in solution are precipitated by the particles of precipitant on the surface of the filtering medium. Although the filter illustrated in the drawings is described as employed for this purpose, it will be understood that the invention is to be by no means restricted to this use inasmuch as it is obvious that it is applicable to any filtering action in which a stream of solution is passed through a filtering medium upon the surface of which solid particles are distributed in contact with which it is desired to bring the solution, whether or not the solution carries the solid particles continuously with it or the first volume of the solution deposits them and the subsequent solution is free from the solid particles.

The filter illustrated in the drawings consists of a number of plates and frames which when clamped together form a series of chambers interconnected by means of inlet and outlet solution channels. In Fig. 3 is shown an elevation of one of the frames, and in Fig. 4 is shown an elevation of one of the plates. Each frame 5 is preferably square in form and is provided with ears or supporting lugs 6 so as to support the frames on the side bars during the assembling of the complete filter. The plates 8 are similarly provided with ears or lugs 9 for the same purpose. The front end of the filter is provided with a head 11 and the opposite end is provided with a rear head 12. Interposed between the last frame and plate unit and the rear head is a follower 13 against which bear the ends of tightening screws 14 threaded in the rear head. In its general principles of construction the filter thus far described is the same as the usual type of plate and frame filter press.

In accordance with the principles of the invention the press is mounted so as to rotate and for this purpose the heads 11 and 12 are provided with trunnions which are journaled upon the supports 16 and 17. The rotation of the filter is secured by an annular gear 19 which is bolted to the front head 11 and meshes with and is driven by a pinion 20 fixed on one end of a shaft 21 journaled in brackets 22 supported by the standard 16. The other end of the shaft 21 carries a worm gear 24 which is driven by a worm 25 mounted on a shaft 26 journaled in the brackets 27 extending from the standard 16. The shaft 26 is driven from any convenient source of power. By means of the above described construction any desired speed of rotation may be imparted to the filter. The speed of rotation will vary somewhat according to the character of work being performed in the filter, but for general precipitation and other purposes it will be found that a speed of one revolution a minute is satisfactory.

The solution undergoing treatment is fed into the filter through a feed pipe 29 and the barren solution is conducted from the filter through the discharge pipe 30. In order that the filter may remain full of solution at all times, even when the flow is interrupted, the inlet and outlet orifices of the pipes 29 and 30 are preferably on a level higher than the top of the filter. The trunnion 32 of the front head 11 is provided with a central core 33 and the inlet or feed pipe 29 enters the core 33 through a stuffing box 34 so that there may be no leakage of the solution between the moving end of the trunnion 32 and the stationary end of the feed pipe 29. The core 33 terminates in a conduit 35 arranged radially in the head 11, said conduit terminating at the inner face of the head near the periphery thereof. The plates and frames are provided at one corner with holes 36 which all register with each other and with the discharge opening of the conduit 35 in the head 11 so that the holes 36 constitute a conduit extending throughout the length of the filter. The holes 36 discharge into the interior of the frames through the pipes 38. The length of the pipes 38 will depend upon the nature of the solution undergoing treatment and the conditions of operation. Preferably the pipes 38 discharge the solution carrying the particles of solid matter in suspension at substantially the middle of the frames. The solution passes from the interior of each frame through the filtering medium 37 with which each face of the plates 6 is covered, leaving the solid particles deposited upon the surface of the filtering medium. The barren or filtered solution is discharged from the filter through a series of aligned holes 40 formed in a corner of the plates and frames. The holes 40 register with the conduit 42 cored in the follower 13. At the point at which the cored hole 42 in the follower 13 connects with the forward end 43 of the discharge pipe 30 the follower 13 is provided with a stuffing box 45 to prevent leakage.

The filter operates as follows: The solution carrying the particles of solid matter in suspension discharges into the interior of the frames 5 by way of the pipes 38. As the whole filter slowly revolves on its trunnions it will be seen that the direction of flow of the stream of solution is constantly and continually changing with respect to the surface of the filtering medium. Moreover, inasmuch as the filtering media themselves are rotating with the pipes 38 they also change their positions relatively to the flow of the stream of solution. By having both the stream of solution and the filtering medium change their relative positions, substantially uniform distribution of the particles of solid matter is secured. By causing the filtering medium to move and shift its position relatively to the stream of solution, the particles of solid matter are prevented from building up on the filtering medium in zones composed of particles of one size. It will be understood that as the filter slowly rotates, the direction of the flow of solution from the pipes 38 constantly changes. At one point in its period of rotation it is pointing upward, at another obliquely, at another horizontally, and at another downwardly. At the same time the filtering medium is rotating so that the heavier particles of the solid matter which constantly tend to fall faster and farther than the lighter particles under the action of gravity, have no opportunity to build up in zones on any particular point of the surface of the filtering medium, but fall in a more or less uniform screen or curtain evenly distributed over substantially the whole of the filtering surface. For the same reason that the larger particles of solid matter are evenly distributed over the filtering surface, the smaller particles are evenly distributed. Thus there is secured an intimate and homogeneous mixture of the larger and smaller particles. The same action which causes the larger and smaller particles to be mixed in a homogeneous manner causes the mixture to be deposited in a layer of substantially uniform thickness.

The mode of operation of the filter illustrated in conjunction with the precipitation of cyanide solutions by means of powdered precipitants such as finely divided zinc is as follows:—The solution carrying the powdered zinc precipitant in suspension passes into the filter through the feed pipe 29 and is discharged into the interior of the frames 5 through the pipes 38. The zinc particles distribute themselves over the surfaces of the filtering media. As the solution passes through the layer of zinc on the surface of the filtering media the metals held in solution are precipitated out onto the particles of zinc and the barren solution finds its way out through the holes 40 and the discharge pipe 30. The solution continues to flow through the filter until there is built up upon the surfaces of the filtering media a compact layer of precipitant and precipitated metal. At stated intervals the operation of the filter is discontinued and the filter is opened for the removal of the accumulated cake of precipitate.

In case a cylindrical form of filter is employed, the frames and plates will have the construction shown in Figs. 5 and 6 respectively. The principle of construction of these parts is substantially the same as that of the parts shown in Figs. 3 and 4 except that they are round instead of square. They are provided with lugs 47 by which they are supported in position when the filter is assembled. The solution carrying the solid particles in suspension enters the frame 48 through the conduit hole 49 and discharges into the middle of the frame through the pipe 50. The solution passes through the filtering medium with which the plate 51 is covered and passes out through the discharge conduit 52. The mode of operation of this form of the invention is precisely as the mode of operation of the preferred form of the invention.

Having thus pointed out the principles of the invention and illustrated and described one embodiment thereof, it being understood that the invention may otherwise be embodied, what I claim as new is:—

1. A filter comprising a series of filtering frames and plates, a filtering medium on the surface of each plate, an inlet conduit passing through the plates and frames and discharging into the interior of each frame, an outlet conduit passing through the plates and frames and receiving the filtered solution from the interior of each plate, and means for rotating the filter.

2. A filter comprising a series of vertically arranged filtering frames and plates, a filtering medium on the surface of each plate, means for conducting a stream of solution carrying solids in suspension into the interior of each frame, and means for causing the solids to be deposited out of the solution in a homogeneous and uniform layer over the filtering media.

3. A filter comprising a series of vertically arranged filtering frames and plates, a filtering medium covering each face of the plates, means for conducting a stream of solution carrying solids in suspension into the interior of the frames, and means for moving the filter so that the solids will deposit out of the solution in a homogeneous layer of uniform thickness on the filtering media.

4. A filter comprising a series of vertically arranged filtering frames and plates, a filtering medium covering each face of the plates, means for rotatably supporting the filter, and means for rotating the filter.

5. A filter comprising a series of vertically arranged filtering frames and plates, a filtering medium covering each face of the plates, heads arranged at the ends of the plates and frames, trunnions formed on the heads for rotatably supporting the filter, means for introducing the solution to be filtered into the frames through one trunnion, and means for conducting the filtered solution out through the other trunnion.

6. A plate and frame filter having filtering media covering the faces of the plates, means for conducting a solution containing solids in suspension to the filtering media so that the solids will be deposited upon the filtering media, and means for revolving the filter so that there will be an intimate and uniform contact between the solution and the solids deposited on the filtering media.

LOUIS D. MILLS.